Patented Oct. 7, 1947

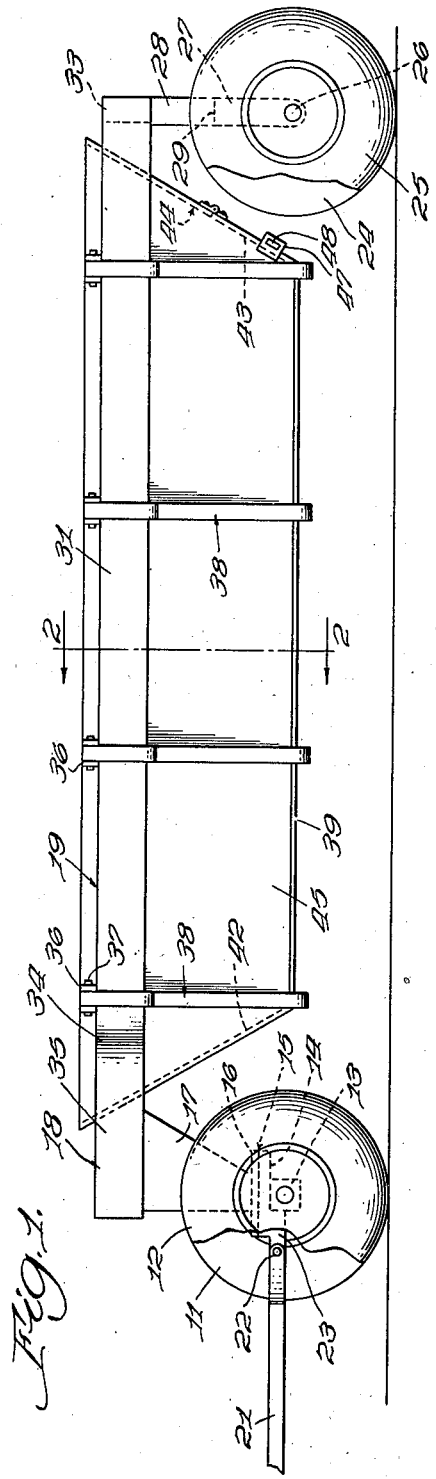

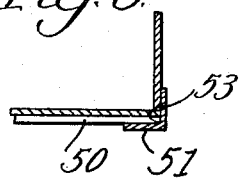
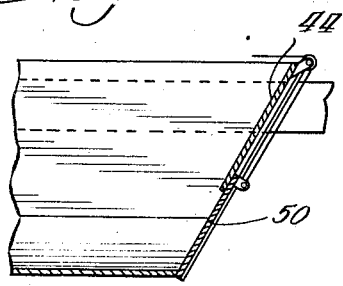
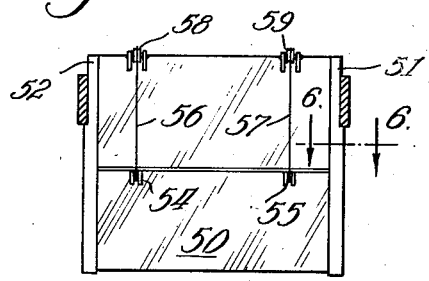
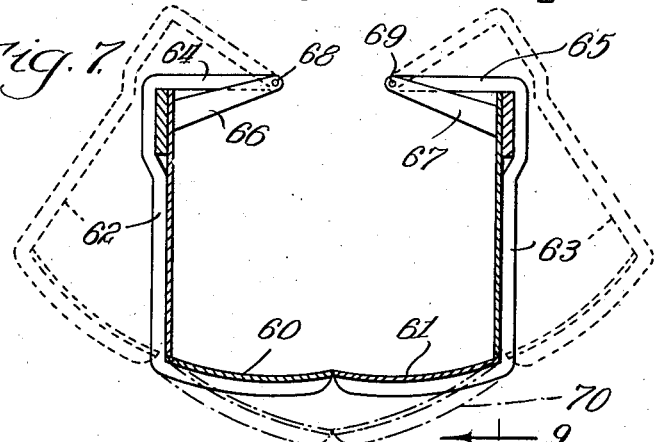
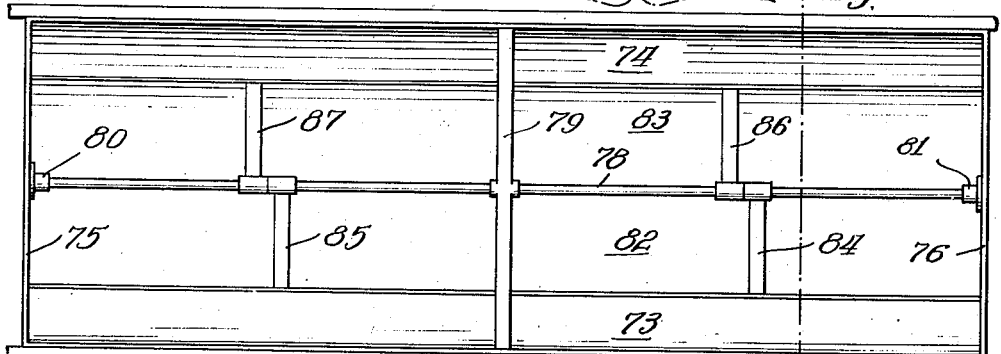
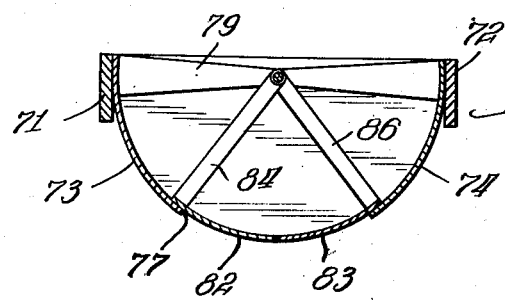

2,428,533

UNITED STATES PATENT OFFICE 2,428,533

BOTTOM DUMP VEHICLE

Lovel R. Simmons, Jackson, Miss.

Application August 30, 1944, Serial No. 551,837

14 Claims. (Cl. 298—35)

This invention has to do with vehicles for hauling earth or similar materials and relates more particularly to such a vehicle having a bottom opening and to an improved dump door construction for such opening.

Vehicles of the present class which are most generally employed for hauling large loads of earth heretofore have been constructed with open bottoms through which the earth may be dumped by displacement of dump doors when the vehicle arrives at the destination for the load. There has been a tendency for certain kinds of earth to accumulate upon the doors which close the bottom opening so that periodically it becomes necessary for the operator or a workman to use a pick or other suitable instrumentality for cleaning these doors. Unless this is done, the load capacity of the vehicle is diminished and its dead weight unduly increased.

One of the objects of the present invention is the provision of dump doors, for a material hauling vehicle, which are self-cleaning when opened pursuant to the dumping operation of the vehicle, thus making it unnecessary to lose valuable time in the manual removal of the accreted material such as gumbo earth. Three embodiments of applicant's self cleaning dump doors are hereinafter shown and described.

Vehicles of the present kind are generally used to haul heavy loads over unlevel, irregular courses upon construction sites, and it is desirable that they have a low center of gravity. There has, however, been a limit upon the lowness of the center of gravity because the body of the vehicle must clear the pile of material dumped therefrom. Conceivably, if a load consisting of large gumbo chunks were to be discharged in a heap through the bottom of the vehicle body and the lower edge at the back end of the body were below the top of this heap, as would be the case if the body were simply lowered to drop the center of gravity, this lower edge of the body would plow into the dumped heap and temporarily strand the vehicle. This situation is more likely under adverse conditions as where the traction vehicle for propelling the load-carrying vehicle would be upon wet, slippery earth. Because of the frequency with which adverse conditions of this kind are likely to be encountered, the bodies of these vehicles have been supported at an elevation raising the center of gravity higher than desired.

A further object of this invention is the provision of a vehicle alleviating the aforesaid difficulty by employing a rearwardly swingable door in the back wall of the body adjacently to the bottom opening, whereby after the material has been dumped from the vehicle adequate clearance will be provided by this door in its backwardly swung position. Two embodiments of applicant's back door are shown and described.

Still a further object is the provision of an earth hauling vehicle having a backwardly swingable door which provides clearance for the discharged material when the vehicle is pulled forwardly and in such a fashion that said door will be scraped over the discharged earth and thus cleaned.

Still a further object is the provision of a self-closing rear door in a vehicle of the above character that is slidable upwardly to open while scraping off against a stationary part of the rear wall any earth tending to cling to the door.

The above and other desirable objects inherent in and encompassed by the invention will be better understood after reading the ensuing description with reference to the annexed drawings, wherein:

Fig. 1 is a side elevational view of a material hauling vehicle constructed according to the principles of this invention;

Fig. 2 is a transverse sectional view taken on the line 2—2 of Fig. 1, illustrating laterally swingable doors for closing the bottom opening in the vehicle body and supporting the load therein;

Fig. 3 is a fragmentary sectional view taken on a vertical plane intersecting the rear wall of the vehicle body;

Fig. 4 is a fragmentary sectional view taken on a vertical plane showing an alternative rear wall of the vehicle body;

Fig. 5 is a rear view of the vehicle body shown in Fig. 4;

Fig. 6 is a view taken on the line 6—6 of Fig. 5;

Fig. 7 is a transverse sectional view of an alternative type of laterally swingable doors for closing the bottom opening;

Fig. 8 is a top plan view of a third type of laterally swingable doors for closing a bottom opening; and Fig. 9 is a transverse sectional view taken on the line 9—9 of Fig. 8.

Continuing to refer to the drawings, and particularly to Figures 1 and 3, there is shown a vehicle having a pair of laterally-spaced rubber-tired front wheels 11 and 12 of which the hubs are mounted upon the opposite ends of a front axle 13. This axle has associated therewith a lower element 14 of a fifth wheel structure 15. The upper element 16 of the fifth wheel structure 15 serves as a base for a pedestal 17 upon which the front end of a frame 18 of an earth-holding body 19 is supported. A draft member 21 is pivotally connected at 22 to a member 23 which is rigidly fixed to the axle 13. The pivoted connection 22 permits the front end of the draft member 21 to be raised or lowered with the draft vehicle (not shown) to which it is connected, while constraining the axle 13 to be swung horizontally with such draft member to steer the present vehicle.

At the rear end of the vehicle there is a pair of laterally spaced rubber-tired wheels 24 and 25 of which the hubs are journaled upon stub axles 26 of which the one associated with the wheel 25 is shown in Fig. 1. These axles are supported in laterally-spaced downwardly projecting legs 27 which depend from a cross member 28. The inner ends of the axles 26 are laterally spaced so that a clearance area for dumped earth is defined by the lower edge 29 of the cross member 28 and the depending members 27. Cross member 28 serves as a support for the back end of the frame 18.

The frame for the body 19 of the vehicle consists of a pair of fore and aft side members 31 and 32 resting at their back ends upon the cross member 28 and further joined by a back end piece 33. The front ends of the frame members 31 and 32 at laterally aligned sections 34 are bent to form converging portions 35 which are connected for support upon the pedestal 17.

A plurality of hinge brackets 36 are secured in spaced relation along the upper edge of each of the frame members 31 and 32, and the ears of these brackets carry pintles 37 on which there are respectively mounted L shaped door hanger members 38. The horizontal legs of these door hanger members 38 are curved (as shown in Fig. 2) as are doors 39 and 41 which are respectively supported thereon. These doors 39 and 41, when in the closed position illustrated in Fig. 2 complementally close the bottom opening of the vehicle body 19 and extend all the way from the lower edge of the front wall 42 to the lower edge of a door 43 forming the lower section of an inclined rear wall 44 of such body. The doors 39 and 41 are formed with a curvature having a center in their respectively associated pintles 37, and the length of radius of the curvature is substantially equal to the distance between such pintles and the lower edges of their respectively associated side walls 45 and 46 of the vehicle body. This location of the pivotal support for the bottom doors 39 and 41 and their radius of curvature is such that these doors will virtually scrape along the lower edges of their associated body side walls 45 and 46 when swung from the closed position shown in solid lines in Fig. 2 to the dotted line position shown in Fig. 2, and thereby automatically remove all foreign matter from the upper faces of these doors each time the vehicle is dumped.

In view of power dumping apparatus for doors of this general type being well known to those familiar with the art, no particular operating means is shown for the doors 39 and 41. It will suffice to say that these doors may be moved at will between their open and closed positions by power means.

Concurrently with the swinging of the bottom doors 39 and 41 to their dotted line open position, Fig. 2, the door 43 forming the lower portion of the rear wall 44 will be released by the tripping of latch devices 47 supported upon the rear ends of the side walls 45 and 46 and having latch members 48 cooperating with opposite lateral edge portions of said door. The latch devices 47 may be of any conventional construction, and the latch members 48 thereof may be retracted laterally outwardly from their positions behind the door 43 either by a force exerted manually through cords or cables (not shown) reaching to the operator of the traction vehicle, or by motors remotely controlled by said operator.

Upon the opening of the rearwardly swingable door 43, the heap of dumped earth discharged through the bottom opening of the vehicle body will be engaged by said door, causing it to swing backwardly into some such position as shown by the dotted lines in Fig. 3 while the vehicle is pulled forwardly away from the dumped heap of earth. Meanwhile, the lower face of the door 43 will be scraped by dumped material or earth for removing any material which should tend to adhere to said door.

Subsequent to the vehicle having been pulled away from the dumped material, the vehicle body will be conditioned for the reception of a subsequent load by the placing of the doors 39 and 41 and the rearwardly swingable door 43 into their closed positions shown by the solid lines in the drawings.

It will be appreciated that doors forming the lower half of the rear wall of the body may be vertically hinged, one to each side wall, and thereby provide the same clearance for the body over dumped material.

An alternative construction for the rear doors is illustrated in Figs. 4, 5, and 6, wherein a lower rear door 50 comprises a plate having its inner surface slidable in substantially flush engagement with the outer surface of the rear wall 44 of the vehicle body. This relationship is maintained by means of flange members 51 and 52 which form channels such as 53, see Fig. 6, in which the bottom door 50 is guided. Returning to Figs. 5 and 4, on the upper outside of the door 50 is a pair of brackets 54 and 55 to which are attached the ends of cables 56 and 57 drawn over pulleys 58 and 59 respectively mounted on the upper side of the back wall 44. The cables 56 and 57 are raised and lowered by any suitable means. It will be noted that in raising the door 50 it will clean itself on the lower edge of the back wall 44.

While power means is used to open and close the laterally suspended bottom doors of this type of vehicle, it is nevertheless desirable to promote return of the doors to their normal closed position by utilization of gravity. In Fig. 7, the laterally swingable doors 60 and 61 are suspended from hanger members 62 and 63 in the same manner as the doors shown in Fig. 2, but in Fig. 7 the hanger members have at their upper ends inwardly directed arms 64 and 65. Extending inwardly of the top of the body are supporting brackets such as 66 and 67. The hanger members 62 and 63 are supported at pivot points 68 and 69. As in the earlier described construction, the curvature of the bottom doors 60 and 61 are cylindrical surfaces having longitudinal axes containing the pivot points 68 and 69, respectively. In the embodiment shown in Fig. 7, however, it will be noted that the swingable doors form a more nearly level bottom, thus increasing the capacity of the body, because the pivot points are closer to the vertical longitudinal central plane of the dump body. It will be appreciated that the arms 64 and 65 could be extended so that the arm 65 could be pivoted on the bracket 66 and the arm 64 could be pivoted on the bracket 67. If this were done, the bottom doors 60 and 61 would in closed position have a curvature such as that shown in the dotted lines 70.

The mounting of the hanger members 62 and 63 from a point centrally of the top of the body interferes somewhat with the loading of the body and the extent to which such mounting is employed will depend somewhat upon the nature of the material that is to be placed in the dump body. If the dump body is to be filled by dumping loads of stone and the like onto brackets 66 and 67, it may not be desirable to employ the construction shown in Fig. 7 because the pivot pintles may be knocked out of alinement during the loading process. On the other hand, it may be found feasible to shield these points by a heavy steel shield or even to build the hanger members of such strength that only two on each side will be required, namely, one at the front and one at the back of the dump body.

In Figs. 8 and 9, a further embodiment of the invention is shown. The side members which constitute the main longitudinal supports of the frame are here numbered 71 and 72. The side walls of the body comprise cylindrical segments 73 and 74 which are attached to the side members 71 and 72 by any suitable means and which define with end walls 75 and 76, see Fig. 8, a rectangular opening 77 extending the entire length of the dump body. Mounted in the axis of the cylindrical segments 73 and 74 between the end walls 75 and 76 is a shaft 78 which is additionally supported midway of the length of the dump body by the cross arm 79. The shaft 78 is mounted on the end walls 75 and 76 by the blocks 80 and 81. Rotatively suspended from the shaft 78 are complemental swingable bottom doors 82 and 83 by means of hanger members 84, 85, 86 and 87 respectively. These doors 82 and 83 are cylindrical segments and when they are swung upwardly, they will clean the inside walls of the sides 73 and 74. The means for opening these doors is not shown because it is not thought necessary as this could be effected in various ways, notably by raising and lowering the hanger members 84 through 87. Power means would be employed.

Having thus disclosed several embodiments of my invention, I claim:

1. A material hauling vehicle comprising a frame, front and rear support means for said frame, a dump body having a rear wall supported on said frame, a bottom opening in said dump body positioned in front of the rear support means, closure means for said bottom opening, and means enabling the lower portion of said rear wall to move from its normal position, whereby when material dropped through the bottom opening piles above its edges and the vehicle is moved forwardly, the said lower portion of the back wall will be moved out of normal position by said material.

2. A material hauling vehicle comprising a frame, a pair of spaced wheels at the rear of said frame, a dump body supported on said frame, the lower part of the rear wall of said dump body consisting of a movable section, a bottom opening in said dump body positioned in front of the two rear wheels, closure means for said bottom opening, and pivot means for enabling the section of the rear wall to move out of normal position, whereby when material dropped through the bottom opening piles above its edges and the vehicle is moved forwardly, the said back wall section of the dump body will be moved backwardly out of obstructing engagement with the material.

3. A material hauling vehicle comprising a frame, support means at the front of said frame, a pair of spaced wheels at the rear of said frame, a dump body supported on said frame, the lower part of the rear wall of said body consisting of a door suspended from a horizontal hinge, the bottom opening in said dump body being positioned in front of the two rear wheels, and closure means for said bottom opening, whereby when material dropped through the bottom opening piles above its edges and the vehicle is moved forwardly, the rear wall door will be swung backwardly by the material so as not to interfere with forward motion of the vehicle.

4. A material hauling vehicle comprising a frame, support means at the front and rear of said frame, a dump body supported on said frame, the lower part of the rear wall of said dump body consisting of a section movable out of normal position by material pushing thereagainst, a bottom opening in said dump body, and closure means for said bottom opening, said closure means comprising surfaces movably engageable with the bottom edges of the side walls of said dump body, whereby when the closure means is opened, it will clean itself on the lower edges of the dump body.

5. A material hauling vehicle comprising a frame, a dump body having front, rear and side walls mounted on said frame, the bottom edges of said side walls being substantially parallel and constituting two sides of a bottom opening, a closure member for each longitudinal half of said bottom opening consisting of a cylindrical segment with its concave surface upwardly directed, and hanger members pivoted in the axis of said cylindrical segment and holding said closure means with one surface against the bottom edge of its associated sidewall, whereby when the support is pivotally moved outwardly, the closure member will perform a cleaning operation.

6. A material hauling vehicle comprising a frame, front and rear pairs of supporting wheels, a dump body having front, rear and side walls mounted on said frame, the bottom edges of said side walls being substantially parallel and constituting two sides of a bottom opening, a closure member for each longitudinal half of said bottom opening consisting of a cylindrical segment with its concave surface upwardly directed, and hanger members pivoted in the axis of said cylindrical segment at points adjacent the upper edge of the associated side wall, said hanger members holding said closure means with the latter's upper surface substantially against the lower edge of said associated side wall, whereby when the hanger members are pivotally moved outwardly, the closure member will clean itself on the edge of its associated side wall.

7. A material hauling vehicle comprising a frame, front and rear pairs of supporting wheels, a dump body having front, rear and side walls mounted on said frame, the bottom edges of said side walls being substantially parallel and constituting two sides of a bottom opening, a closure member for each longitudinal half of said bottom opening consisting of a cylindrical segment with its concave surface upwardly directed, and hanger members pivoted to the axis of each cylindrical segment at points between the longitudinal, vertical, central plane of the dump body and the side wall associated with said hanger members, said hanger members holding the closure means with its upper surface against the lower edge of its associated side wall, whereby when the hanger members are pivotally moved outwardly, the closure member will clean itself on the edge of its associated side wall.

8. A material hauling vehicle comprising a frame, front and rear pairs of supporting wheels, a dump body having front, rear and side walls mounted on said frame, the bottom edges of said side walls being substantially parallel and constituting two sides of a bottom opening, a closure member for each longitudinal half of said bottom opening consisting of a cylindrical segment with its concave surface upwardly directed, hanger members extending upwardly from the outer edges of the closure member outside the associated side wall of the dump body and connected to pivot holding means positioned in the axis of the cylindrical surface of the closure member, said hanger members holding the closure means with its upper surface against the bottom edge of its associated side wall, whereby when the hanger members are pivotally moved outwardly, the closure member will clean itself on the lower edge of its associated side wall.

9. A material hauling vehicle comprising a frame, front and rear pairs of supporting wheels, a dump body having front, rear and side walls mounted on said frame, the bottom edges of said side walls being substantially parallel and constituting two sides of a bottom opening, a cylindrical segment extending downwardly and inwardly from the bottom of each of the side walls to define a rectangular opening longitudinally extending in the bottom of the dump body, a pair of cylindrical segments closing said opening and having their outer surfaces engageable with the inner surfaces of the first mentioned cylindrical segments, and means for moving the two closure cylindrical segments outwardly and upwardly to empty the hopper while cleaning the inside surfaces of the cylindrical side wall segments.

10. A material hauling vehicle comprising a frame, front and rear pairs of supporting wheels, a dump body having front, rear and side walls mounted on said frame, the bottom edges of said side walls being substantially parallel so as to constitute the two side edges of a bottom opening, a pair of closure members consisting of cylindrical segments with their concave surfaces upwardly directed from the bottom opening, supports for said closure members pivoted in the axis of their cylindrical surfaces and holding said closure members with their upper surfaces against the lower edges of the associated side wall of each, and a door constituting the lower portion of the rear wall of the dump body, said door being pivoted so that it may move in order to enable the vehicle to clear a pile of dumped material.

11. In a material hauling vehicle, a body having a bottom dump opening bounded by laterally spaced side walls, opposed complemental swinging doors for closing said opening, the upper surfaces of said doors being curved about axes directed longitudinally of the body and inwardly of such body from upper portions of the side walls at least as far as vertical planes intersecting the longitudinal centers of gravity of the respectively associated of such doors, whereby gravitational force is effective to urge the doors entirely into abutting relation to close the opening, and pivot means coincident with such axes and supporting the doors for swinging outwardly about such axes, and the curved upper surfaces of said doors being supported contiguously to their respectively associated side walls for utilizing the same as scrapers in scraping the material from said curved surfaces.

12. A material hauling vehicle comprising a dump body with a bottom discharge opening and a rear wall with a clearance space in its lowermost portion, closure means for said bottom discharge opening, and self cleaning closure means for said space and removable therefrom to adapt the rear end of such body to clear a heap of material dumped through the discharge opening.

13. A material hauling vehicle comprising a dump body with a bottom discharge opening and a rear wall with a clearance space in its lowermost portion, closure means for said bottom discharge opening, a closure panel for said space, said closure panel being slidable upwardly to uncover the space for adapting the rear end of the body to clear a heap of material dumped through the discharge opening.

14. The combination set forth in claim 13, and wherein there is means at the rear of said body past which the inner face of the panel slides contiguously for scraping therefrom any of such material having a tendency to cling thereto.

LOVEL R. SIMMONS.

REFERENCES CITED

The following references are of record in the file of this patent:

UNITED STATES PATENTS

| Number | Name | Date |
| --- | --- | --- |
| 1,087,343 | Abbott | Feb. 17, 1914 |
| 2,268,290 | Landis | Dec. 30, 1941 |
| 729,266 | Brenzinger | May 26, 1903 |
| 873,397 | Warner | Dec. 10, 1907 |